(12) United States Patent
Döbler et al.

(10) Patent No.: US 7,169,834 B2
(45) Date of Patent: *Jan. 30, 2007

(54) IR ABSORBING COMPOSITIONS

(75) Inventors: Martin Döbler, Düsseldorf (DE); Werner Hoheisel, Köln (DE); Helmut Schmidt, Saarbrücken (DE); Ralph Nonninger, Saarbrücken (DE); Martin Schichtel, Saarbrücken (DE); Martin Jost, Saarbrücken (DE)

(73) Assignee: Leibniz-Institut Fuer Neue Materialien Gemeinnuetzige GmbH, Saarbruecken (DE)

( * ) Notice: Subject to any disclaimer, the term of this patent is extended or adjusted under 35 U.S.C. 154(b) by 348 days.

This patent is subject to a terminal disclaimer.

(21) Appl. No.: 10/203,249

(22) PCT Filed: Jan. 28, 2001

(86) PCT No.: PCT/EP01/00961

§ 371 (c)(1),
(2), (4) Date: Aug. 7, 2002

(87) PCT Pub. No.: WO01/59003

PCT Pub. Date: Aug. 16, 2001

(65) Prior Publication Data

US 2003/0122114 A1 Jul. 3, 2003

(30) Foreign Application Priority Data

Feb. 11, 2000 (DE) ................................. 100 06 208

(51) Int. Cl.
*C08K 3/10* (2006.01)
*C08K 3/18* (2006.01)
*C08K 3/22* (2006.01)
*C08K 9/04* (2006.01)

(52) U.S. Cl. ................ 524/10; 524/431; 524/432; 524/433; 524/434; 524/435; 524/436; 524/444; 524/445

(58) Field of Classification Search ................ 524/430, 524/431, 432, 433, 434, 435, 436, 444, 445
See application file for complete search history.

(56) References Cited

U.S. PATENT DOCUMENTS

| 2,991,273 | A |   | 7/1961  | Hechelhammer et al. |         |
|-----------|---|---|---------|---------------------|---------|
| 2,999,835 | A |   | 9/1961  | Goldberg            |         |
| 2,999,846 | A |   | 9/1961  | Schnell et al.      |         |
| 3,028,365 | A |   | 4/1962  | Schnell et al.      |         |
| 3,148,172 | A |   | 9/1964  | Fox                 |         |
| 3,271,367 | A |   | 9/1966  | Schnell et al.      |         |
| 4,715,986 | A | * | 12/1987 | Gruning et al.      | 516/100 |
| 4,982,014 | A |   | 1/1991  | Freitag et al.      |         |
| 5,288,778 | A |   | 2/1994  | Schmitter et al.    |         |
| 5,518,810 | A | * | 5/1996  | Nishihara et al.    | 428/328 |
| 5,807,511 | A |   | 9/1998  | Kunimatsu et al.    |         |
| 5,821,380 | A |   | 10/1998 | Holderbaum et al.   |         |
| 5,883,165 | A |   | 3/1999  | Krohnke et al.      |         |
| 6,200,680 | B1| * | 3/2001  | Takeda et al.       | 428/402 |
| 6,296,943 | B1|   | 10/2001 | Watanabe et al.     |         |
| 6,329,058 | B1| * | 12/2001 | Arney et al.        | 428/403 |
| 6,455,158 | B1| * | 9/2002  | Mei et al.          | 428/403 |
| 6,833,088 | B1|   | 12/2004 | Isobe et al.        |         |
| 2003/0094600 | A1 |   | 5/2003 | Bler et al.        |         |

FOREIGN PATENT DOCUMENTS

| DE | 1570703    |   | 2/1970  |
|----|------------|---|---------|
| DE | 2063050    |   | 7/1972  |
| DE | 2063052    |   | 7/1972  |
| DE | 2211956    |   | 10/1973 |
| DE | 3832396    |   | 2/1990  |
| EP | 0500496    |   | 8/1992  |
| EP | 0 687 923  |   | 12/1995 |
| EP | 0687923    | * | 12/1995 |
| EP | 0839623    |   | 5/1998  |
| FR | 1561518    |   | 3/1969  |
| GB | 1122003    |   | 7/1968  |
| GB | 1229482    |   | 4/1971  |
| GB | 1341318    |   | 12/1973 |
| GB | 1367788    |   | 9/1974  |
| GB | 1367790    |   | 9/1974  |
| JP | 61-62039   |   | 3/1986  |
| JP | 61-62040   |   | 3/1986  |
| JP | 61-105550  |   | 5/1986  |
| JP | 6-184470   |   | 7/1994  |
| JP | 06-184470  | * | 7/1994  |
| JP | 7-278795   |   | 10/1995 |
| JP | 09-059591  | * | 3/1997  |
| JP | 9-316363   |   | 12/1997 |

(Continued)

OTHER PUBLICATIONS

Chem. Rev. (month unavailable) 1992, 92, pp. 1197-1226, "Near-Infrared Absorbing Dyes" by Jürgen Fabian, Hiroyuki Nakazumi and Masaru Matsuoka.

(Continued)

*Primary Examiner*—Nathan M. Nutter
(74) *Attorney, Agent, or Firm*—Greenblum & Bernstein, P.L.C.

(57) ABSTRACT

A composition containing transparent thermoplastic polymers and a surface modified oxide particles is disclosed. The size of the particles is less than 200 nm and the composition is suitable for the preparation of products wherever diathermancy is undesirable.

42 Claims, No Drawings

FOREIGN PATENT DOCUMENTS

| | | |
|---|---|---|
| WO | 96/15102 | 5/1996 |
| WO | 01/18137 | 3/2001 |

OTHER PUBLICATIONS

Journal of the Franklin Institute 230, (month unavailable) 1940, pp. 583-618, "Proposed Standard Solar-Radiation Curves for Engineering Use" by Parry Moon.

Database WPI, Section Ch, Week 199616, Derwent Publications Ltd., London, GB; AN 1996-157341 XP002164803 & JP 08 041441 A (Sumitomo Metal Mining Co), Feb. 13, 1996 in der Anmeldung erwähnt Zusammenfassung.

Database WPI, Section Ch, Week 199612, Derwent Publications Ltd., London, GB; AN 1996-111440 XP002164802 & JP 08 011266 A (Aisin Seiki KK), Jan. 16, 1996 in der Anmeldung er wähnt Zusammenfassung.

English Language Abstract of DE3832396.

* cited by examiner

IR ABSORBING COMPOSITIONS

The present invention concerns compositions containing transparent thermoplastic polymers and surface-modified oxide particles having a particle size of less than 200 nm together with their manufacture, use and products manufactured therefrom.

In the automotive sector and in buildings, glazing systems made from compositions containing transparent thermoplastic polymers such as polycarbonate, for example, offer many advantages over conventional glazing systems made from glass, such as greater break resistance or weight savings. In the case of automotive glazing systems, they provide greater passenger safety in the event of traffic accidents, and the weight savings reduce fuel consumption. Finally, transparent thermoplastic polymers and compositions containing transparent thermoplastic polymers provide substantially greater design freedom due to their easier mouldability.

However, the high diathermancy (i.e. transmittance for IR radiation) of transparent thermoplastic polymers leads to an undesirable temperature rise inside the vehicle under the influence of sunlight. As described by Parry Moon, Journal of the Franklin Institute 230, pages 583–618(1940), most solar energy in addition to the visible range of light between 400 and 750 nm comes within the near infrared (NIR) range between 750 and 2500 nm. Penetrating solar radiation is absorbed inside a vehicle, for example, and emitted as long-wave heat radiation of 5 to 15 µm. Since conventional glazing materials and transparent thermoplastic polymers in particular are not transparent in this range, the heat radiation cannot dissipate to the outside. A greenhouse effect is obtained. In order to minimise this effect, the transmission of glazing in the NIR should be kept as low as possible. Conventional transparent thermoplastic polymers such as polycarbonate are transparent in both the visible range and in the NIR, however. Therefore additives, for example, are needed that demonstrate as low a transparency as possible in the NIR with as high a transparency as possible in the visible range of the spectrum.

Various heat-repellent systems having a low transmission in the NIR have been described in the literature. Surface coatings or paint systems are known on the one hand, and on the other hand there are also infrared-absorbing additives for transparent thermoplastic polymers. Since polymer-additive compositions can be produced more cost-effectively, an NIR-absorbing additive would be desirable.

Examples of known NIR-absorbing additives include organic infrared absorbers, as described in J. Fabian, H. Nakazumi, H. Matsuoka, Chem.Rev. 92, page 1197 et seq. (1992), for example. Most known organic NIR absorbers absorb in the wavelength range from approx. 750 to approx. 900 nm. However, the literature contains no mention of organic NIR absorbers whose absorption maximum is above 1100 nm and which because of their thermal stability and lightfastness are suitable for the above-mentioned applications in glazing systems. There are thus no suitable organic absorbers for a complete absorption of NIR radiation between 750 and 2500 nm.

On the other hand, paint systems having NIR-absorbing particles consisting of indium tin oxide (ITO) have been described in the literature. Depending on their composition and concentration, such additives absorb in a substantially greater NIR range. ITO particles that are embedded in an organic or inorganic matrix of a paint and that absorb NIR light effectively as well as being highly transparent in the visible range are known from JP-A 08011266, JP-A 0707482 and from JP-A 08041441.

The disadvantages of the paint systems described in the previous paragraph, however, are that they require a complex painting stage and that, incidentally, a sufficient quantity of ITO cannot be incorporated into the known paint systems without their becoming unstable.

In JP-A 070278795 polycarbonate is mixed with conventional ITO with the aid of a kneader. No reference was made to the transparency of the mixture, however. Conventional ITO produces cloudy composites with polycarbonate. This is not suitable for many of the desired applications in this case, e.g. for glazing systems.

When they are finely divided, conventional NIR-absorbing nanoparticles (nanoparticles should hereafter be understood to refer to particles having a size of less than 200 nm), which are invisible because of their small size, are suitable for inclusion in a paint system but not for incorporation into a thermoplastic polymer, however, since under conventional incorporating conditions the nanoparticles agglomerate, forming cloudy compositions due to light scattering at the agglomerates.

Thus, for example, NIR-absorbing nanoparticles which on the one hand absorb in a wide NIR range and yet at the same time demonstrate high transparency in the visible range of the electromagnetic spectrum, and which can be incorporated into transparent thermoplastic polymers without agglomerating, are desirable.

The object of the present invention is therefore to provide compositions that exhibit as high an absorption as possible in the near infrared (NIR) range between 750 and 2500 nm and at the same time exhibit as high a transparency as possible in the visible light range between 400 and 750 nm. The remaining spectrum of material properties of the composition should as far as possible not be impaired. The disadvantages of the compositions known from the prior art should be overcome.

It has now surprisingly been found that by adding surface-modified oxides having a particle size of less than 200 nm to transparent thermoplastic polymers, compositions are obtained that display a high transparency in the visible range of light and at the same time display an intensive absorption in the near infrared. These compositions can be produced by extrusion or by means of a kneader, for example.

The compositions according to the invention have numerous advantages. The material properties of the compositions determined by the transparent thermoplastic polymer and optionally by other additives that are present are not substantially impaired by the oxide particles according to the invention.

Furthermore, the compositions according to the invention have the advantages of high light resistance, high thermal stability as well as the advantage that they display no optical yellowness.

The invention therefore provides compositions containing
a) a transparent thermoplastic polymer and
b) oxide particles selected from the group consisting of indium oxide in which 2 to 30% of the indium atoms are replaced by tin atoms, indium oxide in which 10 to 70% of the oxygen atoms are replaced by fluorine atoms, tin oxide in which 2 to 60% of the tin atoms are replaced by antimony atoms, tin oxide in which 10 to 70% of the oxygen atoms are replaced by fluorine atoms, zinc oxide in which 1 to 30% of the zinc atoms are replaced by aluminium atoms, zinc oxide in which 2 to 30% of the zinc atoms are replaced by indium atoms, zinc oxide in which 2 to 30% of the zinc atoms are replaced by gallium atoms, perovskites, and compounds having the composition $A_xBO_{3-y}$, whereby 0.01<x<3, preferably 0.1<x<1 and
0.001<y<1.5, preferably 0.1<y<0.5, and
A=Ca, Sr, Ba, Al, In, Sn, Pb, Cu, Ag, Cd, Li, Na, K, Rb, Cs, La, Ce, Pr, Nd, Sm, Eu, Gd, Tb, Dy, Ho, Er, Tm, Yb, Lu, H or $NH_4$,
B=W, Mo or Re and
whereby the average particle size of the oxide particles (measured by ultracentrifugation) is less than 200 nm,
and whereby the surface of the oxide particles is modified with a polyvinyl acetal or with a compound having the general formula (I)

$$SiR^1R^2R^3R^4 \qquad (I)$$

where
$R^1$=alkyl substituent with 1 to 30, preferably 6 to 20, particularly preferably 12 to 18 C atoms,
$R^2$=alkyl substituent with 1 to 30, preferably 1 to 18, particularly preferably 1 to 6 C atoms or alkoxy substituent with 1 to 30, preferably 1 to 6, particularly preferably 1 to 2 C atoms or Cl or Br or I,
$R^3$=alkyl substituent with 1 to 30, preferably 1 to 18, particularly preferably 1 to 6 C atoms or alkoxy substituent with 1 to 30, preferably 1 to 6, particularly preferably 1 to 2 C atoms or Cl or Br or I,
$R^4$=alkoxy substituent with 1 to 30, preferably 1 to 6, particularly preferably 1 to 2 C atoms or Cl or Br or I, and whereby the oxide particles are preferably present in a quantity of 0.01 to 30 parts by weight, particularly preferably 0.1 to 2 parts b) weight, per 100 parts by weight of transparent, thermoplastic polymer.

The invention therefore provides the use of the cited oxide particles for the production of compositions containing
a) a transparent thermoplastic polymer and
b) the oxide particles, preferably in a quantity of 0.01 to 30 parts by weight, particularly preferably 0.1 to 2 parts by weight, per 100 parts by weight of transparent, thermoplastic polymer.

The invention further provides a process for the production of said compositions by addition of the oxide particles before, during or after polymerisation of the transparent, thermoplastic polymer to the transparent thermoplastic polymer or to the monomers from which the transparent thermoplastic polymer is polymerised.

The invention further provides the use of said compositions in the manufacture of sheets, films, glazing systems, roofing systems or other products.

The invention further provides a process for the manufacture of products from said compositions consisting in processing the compositions by extrusion or injection moulding.

The invention further provides products containing said compositions. Preferably the products substantially include said compositions. Particularly preferably the products consist of said compositions.

The invention particularly provides sheets or films or glazing systems or roofing systems containing said compositions. Preferably the sheets or films or glazing systems or roofing systems substantially include said compositions. Particularly preferably the sheets or films or glazing systems or roofing systems consist of said compositions.

Preferred oxide particles according to the invention are oxide particles consisting of indium oxide in which 2 to 30% of the indium atoms are replaced by tin atoms (known as tin-doped indium oxide, abbreviated to ITO). Particularly preferred is indium oxide in which 4 to 12% of the indium atoms are replaced by tin atoms.

Preferred oxide particles are further those consisting of tin oxide in which 2 to 60% of the tin atoms are replaced by antimony atoms (known as antimony-doped tin oxide, abbreviated to ATO).

Further preferred oxide particles are those consisting of indium oxide in which 10 to 70% of the oxygen atoms are replaced by fluorine atoms (known as fluorine-doped tin oxide, abbreviated to FTO).

Further preferred oxide particles are those consisting of zinc oxide in which 1 to 30% of the zinc atoms are replaced by aluminium atoms (known as aluminium-doped zinc oxide, abbreviated to AZO).

The average particle size of the oxide particles according to the invention (measured by means of ultracentrifugation) is less than 200 nm. It is preferably between 3 nm and 200 nm, particularly preferably between 5 nm and 50 nm, most particularly preferably between 5 nm and 30 nm.

The oxide-particles according to the invention are protected against agglomeration during processing (e.g. production of the compositions according to the invention) by means of a special surface treatment (also known as surface modification) with surface modifiers. Polyvinyl acetals and compounds having the general formula (I)

$$SiR^1R^2R^3R^4 \qquad (I)$$

are suitable for a surface treatment, whereby the stated definitions for $R^1$, $R^2$, $R^3$ and $R^4$ apply.

Particularly suitable are n-octadecyl trimethoxysilane, n-hexadecyl trimethoxysilane, methyl-n-octadecyl dimethoxysilane, dimethyl-n-octadecyl methoxysilane, n-dodecyl triethoxysilane, n-octadecyl methyl diethoxysilane.

Most particularly suitable are n-octadecyl trimethoxysilane and n-hexadecyl trimethoxysilane.

Polyvinyl acetals, particularly polyvinyl butyral (PVB) are also suitable.

Mixtures of several of the cited surface modifiers are also suitable.

The $SiR^1R^2R^3R^4$ compounds having the general formula (I) can be produced according to known methods. They are also commercially available, for example from Aldrich (D-89555 Steinheim, Germany).

The surface modification of the oxide particles according to the invention can be performed by any method known to the person skilled in the art.

The oxide particles according to the invention can be produced according to known methods. By way of example and preferably, a process of co-precipitation of salts of the components used, in the presence of one or more surface-modified components, can be used. After removal of the solvent, the powders obtained are calcined under reducing conditions and then subjected to a mechanical comminution treatment following addition of additives and a further surface modifier (dispersing agent).

The following compounds can be used as the surface-modifying component for use in production of the oxide particles according to the invention:
1. Group of mono- and polycarboxylic acids, such as acetic acid, propionic acid, butyric acid, pentanoic acid, hexanoic acid, acrylic acid, methacrylic acid, crotonic acid, citric acid, adipic acid, succinic acid, glutanic acid, oxalic acid, maleic acid, stearic acid and particularly trioxadecanoic acid together with the corresponding anhydrides.
2. Betacarbonyl compounds, particularly acetyl acetone, 2,4-hexanedione, 3,5-heptanedione, acetoacetic acid and alkyl acetoacetate.

3. Amino acids, particularly β-alanine.
4. Double-comb polymers, particularly Tween80®.
5. Acid amides, particularly caprolactam.

Suitable starting substances for production of the particularly preferred oxide ITO are, particularly, indium chloride, indium nitrate, indium acetate, indium sulfate or indium alkoxides or tin chloride, tin sulfate or tin alkoxides. Primary, secondary, tertiary, aliphatic or aromatic amines, tetramethyl ammonium hydroxide, NaOH, KOH, ammonia (gaseous) and in particular ammonium hydroxide are preferably used for precipitation of the indium and tin precursors. Calcination of the powder thus obtained (an indium tin oxide-hydroxide mixture) is preferably performed under reducing conditions at temperatures of between 200 and 400° C. (preferably 250° C.). The isothermic residence time is between 15 and 120 minutes, for example, preferably 60 minutes. The reduction can be performed by carbon monoxide or carbon monoxide nitrogen or water vapour, hydrogen or forming gas (hydrogen, nitrogen). The suspension is produced by dispersing the powders by means of a mechanical comminution process, for example, using the surface-active substances already mentioned above. Comminution is performed for example in planetary ball mills, attrition mills and particularly in a mortar mill and in a roll mill, in solvents such as water, toluene, but particularly in ethylene glycol or diethylene glycol monobutyl ether.

Relative to 100 parts by weight of oxide particles according to the invention, the surface-modifiers are preferably used in quantities of 10 to 2000 parts, particularly preferably in quantities of 90 to 1000 parts and most particularly preferably in quantities from 90 to 600 parts.

Transparent thermoplastic polymers in the sense of the invention are, for example, polycarbonates, aromatic polyesters such as PET, PEN or PETG, transparent thermoplastic polyurethanes, transparent acrylates and methacrylates such as PMMA, and polyolefins, such as transparent polypropylene grades or polyolefins based on cyclic olefins (eg. TOPAS®, a commercial product from Hoechst). Mixtures of several transparent thermoplastic polymers are also possible.

Polycarbonates or copolycarbonates are preferred.

Particularly preferred polycarbonates are the homopolycarbonate based on bisphenol A, the homopolycarbonate based on 1,1-bis(4-hydroxyphenyl)-3,3,5-trimethycyclohexane and the copolycarbonates based on the two monomers bisphenol A and 1,1-bis(4-hydroxyphenyl)-3,3,5-trimethylcyclohexane.

Polycarbonates in the sense of the present invention are both homopolycarbonates and copolycarbonates; the polycarbonates can be linear or branched by known means.

The polycarbonates are produced by known means from diphenols, carbonic acid derivatives, optionally chain terminators and optionally branching agents.

Details of the production of polycarbonates have been set down in many patent specifications over some 40 years. Reference is made here by way of example only to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertné, BAYER AG, "Polycarbonates" in Encyclopedia of Polymer Science and Engineering, Volume 11, Second Edition, 1988, pages 648–718, and finally to Drs U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag, Munich, Vienna 1992, pages 117–299.

Examples of suitable diphenols for production of the polycarbonates include hydroquinone, resorcinol, dihydroxydiphenyls, bis(hydroxyphenyl)alkanes, bis(hydroxyphenyl)cycloalanes, bis(hydroxyphenyl)sulfides, bis(hydroxyphenyl)ethers, bis(hydroxyphenyl)ketones, bis(hydroxyphenyl)sulfones, bis(hydroxyphenyl)sulfoxides, α,α'-bis(hydroxyphenyl)diisopropyl benzenes, and ring-alkylated and ring-halogenated compounds thereof.

Preferred diphenols are 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)-p-diisopropyl benzene, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methyl butane, 1,1-bis(3,5-dimethyl-4-hydroxyphenyl)-p-diisopropyl benzene, 2,2-bis(3,5-dichloro-4-hydroxyphenyl)propane, 2,2-bis(3,5-dibromo-4-hydroxyphenyl)propane and 1,1-bis(4-hydroxyphenyl)-3,3,5-trimethylcyclohexane.

Particularly preferred diphenols are 2,2-bis(4-hydroxyphenyl)propane, 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane and 1,1-bis(4-hydroxyphenyl)-3,3,5-trimethylcyclohexane.

These and other suitable diphenols are described for example in U.S. Pat. No. 3,028,635, U.S. Pat. No. 2,999,835, U.S. Pat. No. 3,148,172, U.S. Pat. No. 2,991,273, U.S. Pat. No. 3,271,367, U.S. No 4,982,014 and U.S. Pat. No. 2,999,846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of homopolycarbonates only one diphenol is used, in the case of copolycarbonates more than one diphenol is used.

Suitable carbonic acid derivatives include, for example, phosgene or diphenyl carbonate.

Suitable chain terminators that can be used in the production of the polycarbonates include both monophenols and monocarboxylic acids. Suitable monophenols are phenol itself, alkyl phenols such as cresols, p-tert.-butyl phenol, p-n-octyl phenol, p-isooctyl phenol, p-n-nonyl phenol and p-isononyl phenol, halophenols such as p-chlorophenol, 2,4-dichlorophenol, p-bromophenol and 2,4,6-tribromophenol 2,4,6-triiodine phenol, p-iodine phenol, and mixtures thereof.

The preferred chain terminator is p-tert.-butyl phenol.

Suitable monocarboxylic acids also include benzoic acid, alkyl benzoic acids and halobenzoic acids.

Preferred chain terminators are phenols having the formula (II)

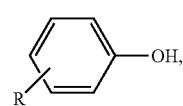

(II)

where
R is hydrogen or a $C_1$–$C_{30}$ alkyl radical, linear or branched, is preferably tert.-butyl or is a branched or unbranched $C_8$ and/or $C_9$ alkyl radical.

The quantity of chain terminator to be used is preferably 0.1 mol % to 5 mol %, relative to mols of diphenols used in each case. The chain terminators can be added before, during or after phosgenation.

Suitable branching agents are the trifunctional or higher than trifunctional compounds known in polycarbonate chemistry, particularly those having three or more than three phenolic OH groups.

Examples of suitable branching agents include phloroglucinol, 4,6-dimethyl-2,4,6-tri-(4-hydroxyphenyl)heptene-2,4, 6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis[4,4-bis(4-hydroxyphenyl)cyclohexyl]propane, 2,4-bis(4-hydroxyphenyl isopropyl)phenol, 2,6-bis(2-hydroxy-5'-methyl benzyl)-4-methylphenol, 2-(4-hydroxyphenyl)-2-(2, 4-dihydroxyphenyl)propane, hexa-(4-(4-hydroxyphenyl isopropyl)phenyl)orthoterephtlialic acid ester, tetra-(4-hydroxyphenyl)methane, tetra-(4-(4-hydroxyphenyl isopropyl)phenoxy)methane and 1,4-bis(4',4"-dihydroxytriphenyl methyl)benzene as well as 2,4-dihydroxybenzoic acid, trimesic acid, cyanuric chloride and 3,3-bis(3-methyl-4-hydroxyphenyl)-2-oxo-2,3-dihydroindole.

The amount of branching agent to be optionally added is preferably 0.05 mol % to 2 mol %, relative again to mols of diphenols used in each case.

The branching agents can either be included with the diphenols and the chain terminators in the aqueous-alkaline phase or added before phosgenation, dissolved in an organic solvent. If the interesterification method is used, the branching agents are added together with the diphenols.

The compositions according to the invention can also contain other conventional polymer additives, such as the UV stabilisers, antioxidants and mould release agents described in EP-A 0 839 623, WO 96/15102 and EP-A 0 500 496, for example, but also flame retardants, glass fibres, fillers, foaming agents, pigments, optical brighteners or dyestuffs known from the literature, in the conventional quantities for the relevant thermoplastics. Quantities of up to 5 wt. % are preferred, preferably 0.01 to 5 wt. % relative to the quantity of compositions, particularly preferably 0.01 wt. % to 1 wt. % relative to the quantity of compositions. Mixtures of several additives are also suitable.

Particularly suitable as UV absorbers are benzotriazoles, triazines, benzophenones, together with other compounds such as arylated cyanoacrylates. Most particularly preferably suitable according to the invention are hydroxy benzotriazoles, such as 2-(3',5'-bis(1,1-dimethylbenzyl)-2'-hydroxyphenyl)benzotriazole (Tinuvin® 234, Ciba Spezialitätenchemie, Basle), Tinuvin® 326 FL, (Ciba Spezialitätenchemie, Basle), 2-(2'-hydroxy-5'-(tert-octyl)phenyl)benzotriazole (Tinuvin® 329, Ciba Spezialitätenchemie, Basle), 2-(2'-hydroxy-3'-(2-butyl)-5'-(tert-butyl)phenyl)benzotriazole (Tinuvin® 350, Ciba Spezialitätenchemie, Basle), bis(3-(2H-benzotriazolyl)-2-hydroxy-5-tert-octyl)methane, (Tinuvin® 360, Ciba Spezialitätenchemie, Basle), 2-(4-hexoxy-2-hydroxyphenyl)-4-6-diphenyl-1,3,5-triazine (Tinuvin® 1577, Ciba Spezialitätenchemie, Basle), and the benzophenone 2,4-dihydroxy benzophenone (Chimasorb22®, Ciba Spezialitätenchemie, Basle).

The UV absorbers are preferably used in quantities of between 0.001 wt. % and 10 wt. % in each case, preferably between 0.01 wt. % and 1 wt. %, preferably between 0.1 and 1 wt. % and most particularly preferably between 0.2 and 0.6 wt. %.

The contents of ions present as contamination in the compositions according to the invention are preferably less than 10 ppm, particularly preferably less than 5 ppm.

The measures involved in the production of thermoplastic polycarbonates are familiar to the person skilled in the art.

The compositions according to the invention can be converted into products, i.e. moulded objects such as toy parts, but also fibres, films, film tapes, sheets, multi-wall sheets, containers, pipes and other profiles, by conventional methods such as hot press moulding, spinning, extrusion or injection moulding. The use of multi-coat systems is also of interest. These can be applied at the same time as or directly after shaping of the basic form, e.g. by coextrusion or sandwich moulding. However, they can also be applied to the final shaped basic form, e.g. by lamination with a film or by coating with a solution.

The compositions according to the invention can be processed into products by extruding the compositions into pellets, for example, and processing these pellets into various products by known means, by injection moulding or extrusion, optionally after addition of the above-mentioned additives.

The compositions according to the invention can further also contain conventional heat stabilisers. Particularly suitable as heat stabilisers according to the invention are: hindered phenols, for example octadecyl-3-(3',5'-di-tert-butyl-4'-hydroxyphenyl)propionate (Irganox® 1076, Ciba Specialty Chemicals, Basle, Switzerland). Other particularly suitable heat stabilisers according to the invention are pliosphites, especially tris(2,4-di-tert-butylphenyl)phosphite (Irgafos® 168, Ciba Specialty Chemicals, Basle, Switzerland), or phosphines, such as triphenyl phosphine.

The compositions according to the invention can contain conventional mould release agents. Particularly suitable mould release agents are pentacrythritol tetrasterate (PETS) or glycerol monostearate (GMS).

Preferred products according to the invention are sheets, films, glazing systems, such as car sunroofs, roofing systems or building glazing systems containing the compositions according to the invention. As further components of the products according to the invention, in addition to the compositions according to the invention, further material components can for example be contained in the products according to the invention. For example, glazing systems can contain sealants at the edge of the glazing systems. Roofing systems can for example contain metal components such as screws or similar, which can serve to secure the roofing elements.

The compositions according to the invention can be universally used as transparent products wherever diathermancy is undesirable. Use in automotive components, such as glazing elements or plastic headlamp diffusers, is particularly suitable. Particularly suitable also is their use in extruded sheets such as solid sheets, twin-wall sheets or multi-wall sheets, optionally also with one or more coextruded layers, and their use in injection moulded articles such as food containers, components of electrical devices and in spectacle lenses, e.g. also for safety goggles.

EXAMPLES

To manufacture the test pieces in the examples, an additive-free, unstabilised polycarbonate (Makrolon® 2808 from Bayer A G, Leverkusen) with an average molecular weight of approx. 28,000 ($M_w$ by GPC), a solution viscosity of η=1.28 (5 g/l methylene chloride, at 25° C.), was compounded at 300° C. on an extruder with the stated quantity of additive and then pelletised. Coloured specimens (76 mm×50 mm×2.5 mm) were then produced by injection moulding.

Example 1

140 g indium(III) chloride (0.63 mol, anhydrous), 18 g tin(IV) chloride×5 $H_2O$ and 5.6 g caprolactam were added to 1400 ml water and stirred. After a clear solution had been formed, this was heated to 50° C. Once this temperature had been reached, 105 ml ammonium hydroxide solution (25%) were added dropwise with vigorous agitation. The suspension was stirred for a further 24 hours at a temperature of 50° C. A further 280 ml ammonium hydroxide solution were then added to the mixture for full precipitation. A white deposit consisting of indium hydroxide was formed, which was centrifuged off (30 min at 4000 rpm). The powder was dried in a vacuum drying oven at 190° C. until a slight yellowing of the powder could be determined. The dried powder was finely ground in a mortar, spread out in crystallising trays and placed in a forming gas oven. The oven was evacuated then flooded with nitrogen. The oven was heated at a heating rate of 250° C./hour to 250° C. with a nitrogen flow of 200 liters/hour. This temperature was maintained for 60 minutes under a forming gas atmosphere at a gas flow of 300 liters/hour. The oven then cooled to room temperature under a nitrogen atmosphere (duration approx. 5 hours). This resulted in dark brown ITO powder.

Example 2

ITO was produced according to example 1. To 100 parts of a 20% suspension thereof in ethanol were added 20 parts n-octadecyl trimethoxysilane followed by treatment for 1 minute in an ultrasonic bath. The solvent was then removed by distillation at 60° C. and 100 mbar. Nanoscale indium tin oxide (ITO) is obtained with an average particle size of less than 50 nm.

Example 3

An aromatic polycarbonate consisting of 2,2-bis(4-hydroxyphenyl)propane with phenol as chain terminator was predried at 110° C. and then melted at 280° C. on a twin-screw extruder. 0.8 wt. % and 1.5 wt. % respectively of freshly produced, surface-modified, nanoscale ITO (example 2) were then added directly to the polycarbonate melt. The polymer extrudate was cooled and pelletised. The pellets were dried in a vacuum drying oven at 80° C. and extruded into specimens measuring 60 mm×60 mm×2 mm on an injection moulding machine at 280° C. The transmission of the specimens was very high in the visible range of light and very low in the NIR (see Table 1).

Comparative Example 1

ITO composites were described in JP-A 08041441. The composite with the strongest absorption in the NIR (designated there as no. 2) was selected as comparative example 1.

In Table 1 the transmission values for the compositions according to comparative example 1 are compared at various wavelengths with inventive examples 3a and 3b.

TABLE 1

Transmission values in the NIR for ITO-containing compositions according to the invention and known from the literature

| Wavelength | Example 3a | Example 3b | Comparative ex. 1 |
|---|---|---|---|
| 300 nm | 0% | 0% | 0% |
| 400 nm | 35% | 31% | 52% |
| 500 nm | 60% | 57% | 73% |
| 600 nm | 67% | 57% | 76% |
| 700 nm | 65% | 46% | 71% |
| 800 nm | 56% | 31% | 66% |
| 900 nm | 41% | 16% | 58% |
| 1000 nm | 24% | 5% | 46% |
| 1100 nm | 10% | 1% | 30% |

As can be seen from Table 1, the transmission in the NIR in the case of examples 3a and 3b according to the invention is substantially lower than in the case of comparative example 1.

The invention claimed is:

1. A composition comprising
   (a) a transparent thermoplastic polymer;
   (b) oxide particles selected from one or more of
      (i) indium oxide in which from 2 to 30% of the indium atoms are replaced by tin atoms;
      (ii) indium oxide in which from 10 to 70% of the oxygen atoms are replaced by fluorine atoms;
      (iii) tin oxide in which from 2 to 60% of the tin atoms are replaced by antimony atoms;
      (iv) tin oxide in which from 10 to 70% of the oxygen atoms are replaced by fluorine atoms;
      (v) zinc oxide in which from 1 to 30% of the zinc atoms are replaced by aluminum atoms;
      (vi) zinc oxide in which from 2 to 30 percent of the zinc atoms are replaced by indium atoms;
      (vii) zinc oxide in which from 2 to 30 percent of the zinc atoms are replaced by gallium atoms;
      (viii) perovskites; and
      (ix) compounds of the formula $A_xBO_{3-y}$,
         wherein:
         $0.01 < x < 3$;
         $0.001 < y < 1.5$;
         A=Ca, Sr, Ba, Al, In, Sn, Pb, Cu, Ag, Cd, Li, Na, K, Rb, Cs, La, Ce, Pr, Nd, Sm, Eu, Gd, Tb, Dy, Ho, Er, Tm, Yb, Lu, H or $NH_4$;
         B=W, Mo or Re;
   wherein an average particle size of the oxide particles is less than 200 nm and a surface of the oxide particles is modified with a surface modifier comprising a polyvinylacetal.
2. The composition of claim 1, wherein the composition comprises from 0.01 to 30 parts by weight of the oxide particles (b) per 100 parts by weight of the polymer (a).
3. The composition of claim 1, wherein the composition comprises from 0.1 to 2 parts by weight of the oxide particles (b) per 100 parts by weight of the polymer (a).
4. The composition of claim 1, wherein the composition comprises indium oxide particles in which from 4 to 12% of the indium atoms are replaced by tin atoms.
5. The composition of claim 2, wherein the average particle size of the oxide particles is at least 3 nm.
6. The composition of claim 3, wherein the average particle size of the oxide particles is from 5 nm to 50 nm.
7. The composition of claim 1, wherein the polyvinylacetal comprises polyvinylbutyral.

8. The composition of claim 1, wherein the oxide particles comprise from 90 to 1,000 parts of surface modifier per 100 parts by weight of oxide.

9. The composition of claim 5, wherein the oxide particles comprise from 90 to 600 parts of surface modifier per 100 parts by weight of oxide.

10. The composition of claim 1, wherein the polymer comprises one or more of a polycarbonate, a polyester, a polyurethane, an acrylate, a methacrylate and a polyolefin.

11. The composition of claim 1, wherein the polymer comprises a polycarbonate.

12. The composition of claim 1, wherein the oxide particles are selected from one or more of
   (i) indium oxide in which from 10 to 70% of the oxygen atoms are replaced by fluorine atoms;
   (ii) tin oxide in which from 10 to 70% of the oxygen atoms are replaced by fluorine atoms;
   (iii) zinc oxide in which from 1 to 30% of the zinc atoms are replaced by aluminum atoms;
   (iv) zinc oxide in which from 2 to 30 percent of the zinc atoms are replaced by indium atoms;
   (v) zinc oxide in which from 2 to 30 percent of the zinc atoms are replaced by gallium atoms;
   (vi) perovskites; and
   (vii) compounds of the formula $A_xBO_{3-y}$
   wherein:
   $0.01<x<3$;
   $0.001<y<1.5$;
   A=Ca, Sr, Ba, Al, In, Sn, Pb, Cu, Ag, Cd, Li, Na, K, Rb, Cs, La, Ce, Pr, Nd, Sm, Eu, Gd, Tb, Dy, Ho, Er, Tm, Yb, Lu, H or $NH_4$;
   B=W, Mo or Re.

13. A composition comprising
(a) a transparent thermoplastic polymer which comprises a polycarbonate based on at least one of bisphenol A and 1,1-bis(4-hydroxyphenyl)-3,3,5-trimethylcyclohexane;
(b) oxide particles selected from one or more of
   (i) indium oxide in which from 2 to 30% of the indium atoms are replaced by tin atoms;
   (ii) indium oxide in which from 10 to 70% of the oxygen atoms are replaced by fluorine atoms;
   (iii) tin oxide in which from 2 to 60% of the tin atoms are replaced by antimony atoms;
   (iv) tin oxide in which from 10 to 70% of the oxygen atoms are replaced by fluorine atoms;
   (v) zinc oxide in which from 1 to 30% of the zinc atoms are replaced by aluminum atoms;
   (vi) zinc oxide in which from 2 to 30 percent of the zinc atoms are replaced by indium atoms;
   (vii) zinc oxide in which from 2 to 30 percent of the zinc atoms are replaced by gallium atoms;
   (viii) perovskites; and
   (ix) compounds of the formula $A_xBO_{3-y}$
   wherein:
   $0.01<x<3$;
   $0.001<y<1.5$;
   A=Ca, Sr, Ba, Al, In, Sn, Pb, Cu, Ag, Cd, Li, Na, K, Rb, Cs, La, Ce, Pr, Nd, Sm, Eu, Gd, Tb, Dy, Ho, Er, Tm, Yb, Lu, H or $NH_4$;
   B=W, Mo or Re;
wherein an average particle size of the oxide particles is less than 200 nm and a surface of the oxide particles is modified with a surface modifier selected from a polyvinylacetal and a compound of formula (I)

$$SiR^1R^2R^3R^4 \qquad (I)$$

wherein
   $R^1$ is selected from alkyl groups having from 1 to 30 C atoms;
   $R^2$ is selected from alkyl groups having from 1 to 30 C atoms, alkoxy groups having from 1 to 30 C atoms, Cl, Br and I;
   $R^3$ is selected from alkyl groups having from 1 to 30 C atoms, alkoxy groups having from 1 to 30 C atoms, Cl, Br and I;
   $R^4$ is selected from alkoxy groups having from 1 to 30 C atoms, Cl, Br and I.

14. The composition of claim 13, wherein the composition comprises from 0.01 to 30 parts by weight of the oxide particles (b) per 100 parts by weight of the polymer (a).

15. The composition of claim 13, wherein the composition comprises from 0.1 to 2 parts by weight of the oxide particles (b) per 100 parts by weight of the polymer (a).

16. The composition of claim 13, wherein the composition comprises indium oxide particles in which from 4 to 12% of the indium atoms are replaced by tin atoms.

17. The composition of claim 13, wherein the average particle size of the oxide particles is at least 3 nm.

18. The composition of claim 13, wherein the average particle size of the oxide particles is from 5 nm to 50 nm.

19. The composition of claim 13, wherein the composition comprises oxide particles whose surface is modified with a polyvinylacetal.

20. The composition of claim 19, wherein the polyvinylacetal comprises polyvinylbutyral.

21. The composition of claim 13, wherein the composition comprises oxide particles whose surface is modified with a compound of formula (I).

22. The composition of claim 21, wherein the compound of formula (I) comprises one or more of n-octadecyl trimethoxysilane, n-hexadecyl trimethoxysilane, methyl-n-octadecyl dimethoxysilane, dimethyl-n-octadecyl methoxysilane, n-dodecyl triethoxysilane and n-octadecyl methyl diethoxysilane.

23. The composition of claim 13, wherein the oxide particles comprise from 90 to 1,000 parts of surface modifier per 100 parts by weight of oxide.

24. The composition of claim 13, wherein the oxide particles are selected from one or more of
   (i) indium oxide in which from 10 to 70% of the oxygen atoms are replaced by fluorine atoms;
   (ii) tin oxide in which from 10 to 70% of the oxygen atoms are replaced by fluorine atoms;
   (iii) zinc oxide in which from 1 to 30% of the zinc atoms are replaced by aluminum atoms;
   (iv) zinc oxide in which from 2 to 30 percent of the zinc atoms are replaced by indium atoms;
   (v) zinc oxide in which from 2 to 30 percent of the zinc atoms are replaced by gallium atoms;
   (vi) perovskites; and
   (vii) compounds of the formula $A_xBO_{3-y}$
   wherein:
   $0.01<x<3$;
   $0.001<y<1.5$;
   A=Ca, Sr, Ba, Al, In, Sn, Pb, Cu, Ag, Cd, Li, Na, K, Rb, Cs, La, Ce, Pr, Nd, Sm, Eu, Gd, Tb, Dy, Ho, Er, Tm, Yb, Lu, H or $NH_4$;
   B=W, Mo nr Re.

25. A composition comprising
(a) a transparent thermoplastic polymer;
(b) oxide particles selected from one or more of
   (i) indium oxide in which from 2 to 30% of the indium atoms are replaced by tin atoms;

(ii) indium oxide in which from 10 to 70% of the oxygen atoms are replaced by fluorine atoms;
(iii) tin oxide in which from 2 to 60% of the tin atoms are replaced by antimony atoms;
(iv) tin oxide in which from 10 to 70% of the oxygen atoms are replaced by fluorine atoms;
(v) zinc oxide in which from 1 to 30% of the zinc atoms are replaced by aluminum atoms;
(vi) zinc oxide in which from 2 to 30 percent of the zinc atoms are replaced by indium atoms;
(vii) zinc oxide in which from 2 to 30 percent of the zinc atoms are replaced by gallium atoms;
(viii) perovskites; and
(ix) compounds of the formula $A_xBO_{3-y}$
wherein:
$0.01<x<3$;
$0.001<y<1.5$;
A=Ca, Sr, Ba, Al, In, Sn, Pb, Cu, Ag, Cd, Li, Na, K, Rb, Cs, La, Ce, Pr, Nd, Sm, Eu, Gd, Tb, Dy, Ho, Er, Tm, Yb, Lu, H or $NH_4$;
B=W, Mo or Re;
wherein an average particle size of the oxide particles is less than 200 nm and a surface of the oxide particles is modified with a surface modifier selected from a polyvinylacetal and a compound of formula (I)

$$SiR^1R^2R^3R^4 \qquad (I)$$

wherein
$R^1$ is selected from alkyl groups having from 1 to 30 C atoms;
$R^2$ is selected from alkyl groups having from 1 to 30 C atoms, alkoxy groups having from 1 to 30 C atoms, Cl, Br and I;
$R^3$ is selected from alkyl groups having from 1 to 30 C atoms, alkoxy groups having from 1 to 30 C atoms, Cl, Br and I;
$R^4$ is selected from alkoxy groups having from 1 to 30 C atoms, Cl, Br and I; and
(c) at least one UV absorber which comprises a hydroxy benzotriazole compound.

26. The composition of claim 25, wherein the composition comprises from 0.01 to 30 parts by weight of the oxide particles (b) per 100 parts by weight of the polymer (a).

27. The composition of claim 25, wherein the composition comprises from 0.1 to 2 parts by weight of the oxide particles (b) per 100 parts by weight of the polymer (a).

28. The composition of claim 25, wherein the composition comprises indium oxide particles in which from 4 to 12% of the indium atoms are replaced by tin atoms.

29. The composition of claim 25, wherein the average particle size of the oxide particles is at least 3 nm.

30. The composition of claim 27, wherein the average particle size of the oxide particles is from 5 nm to 50 nm.

31. The composition of claim 25, wherein the composition comprises oxide particles whose surface is modified with a polyvinylacetal.

32. The composition of claim 31, wherein the polyvinylacetal comprises polyvinylbutyral.

33. The composition of claim 25, wherein the composition comprises oxide particles whose surface is modified with a compound of formula (I).

34. The composition of claim 33, wherein the compound of formula (I) comprises one or more of n-octadecyl trimethoxysilane, n-hexadecyl trimethoxysilane, methyl-n-octadecyl dimethoxysilane, dimethyl-n-octadecyl methoxysilane, n-dodecyl triethoxysilane and n-octadecyl methyl diethoxysilane.

35. The composition of claim 33, wherein the compound of formula (I) comprises one or more of n-octadecyl trimethoxysilane and n-hexadecyl trimethoxysilane.

36. The composition of claim 25, wherein the oxide particles comprise from 90 to 1,000 parts of surface modifier per 100 parts by weight of oxide.

37. The composition of claim 30, wherein the oxide particles comprise from 90 to 600 parts of surface modifier per 100 parts by weight of oxide.

38. The composition of claim 25, wherein the polymer comprises one or more of a polycarbonate, a polyester, a polyurethane, an acrylate, a methacrylate and a polyolefin.

39. The composition of claim 25, wherein the polymer comprises a polycarbonate.

40. The composition of claim 39, wherein the polycarbonate comprises a polycarbonate based on at least one of bisphenol A and 1,1-bis(4-hydroxyphenyl)-3,3,5-trimethylcyclohexane.

41. The composition of claim 25, wherein the oxide particles are selected from one or more of
(I) indium oxide in which from 10 to 70% of the oxygen atoms are replaced by fluorine atoms;
(ii) tin oxide in which from 10 to 70% of the oxygen atoms are replaced by fluorine atoms;
(iii) zinc oxide in which from 1 to 30% of the zinc atoms are replaced by aluminum atoms;
(iv) zinc oxide in which from 2 to 30 percent of the zinc atoms are replaced by indium atoms;
(v) zinc oxide in which from 2 to 30 percent of the zinc atoms are replaced by gallium atoms;
(vi) perovskites; and
(vii) compounds of the formula $A_xBO_{3-y}$
wherein:
$0.01<x<3$;
$0.001<y<1.5$;
A=Ca, Sr, Ba, Al, In, Sn, Pb, Cu, Ag, Cd, Li, Na, K, Rb, Cs, La, Ce, Pr, Nd, Sm, Eu, Gd, Tb, Dy, Ho, Er, Tm, Yb, Lu, H or $NH_4$;
B=W, Mo or Re.

42. The composition of claim 25, wherein the at least one UV absorber comprises one or more of 2-(3',5'-bis(1,1-dimethylbenzyl)-2'-hydroxyphenyl)-benzotriazole, 2-(2'-hydroxy-5'-(tert-octyl)phenyl)benzotriazole, 2-(2'-hydroxy-3'-(2-butyl)-5'-(tert-butyl)phenyl)benzotriazole, bis(3-(2H-benzotriazolyl)-2-hydroxy-5-tert-octyl)methane and 2-(4-hexoxy-2-hydroxyphenyl)-4-6-diphenyl-1,3,5-triazine.

* * * * *